(12) United States Patent
Endo et al.

(10) Patent No.: US 8,153,295 B2
(45) Date of Patent: Apr. 10, 2012

(54) POSITIVE ELECTRODE ACTIVE MATERIAL AND ITS MANUFACTURING METHOD, POSITIVE ELECTRODE FOR LITHIUM SECONDARY CELL USING SAME, AND LITHIUM SECONDARY CELL

(75) Inventors: Daisuke Endo, Takatsuki (JP); Akihiro Fujii, Takatsuki (JP); Ryuji Shiozaki, Musashino (JP); Tokuo Inamasu, Takatsuki (JP); Hiroe Nakagawa, Takatsuki (JP); Toshiyuki Nukuda, Takatsuki (JP)

(73) Assignee: GS Yuasa International Ltd., Kyoto (JP)

( * ) Notice: Subject to any disclaimer, the term of this patent is extended or adjusted under 35 U.S.C. 154(b) by 732 days.

(21) Appl. No.: 10/564,742

(22) PCT Filed: Jul. 13, 2004

(86) PCT No.: PCT/JP2004/010260
§ 371 (c)(1),
(2), (4) Date: Jan. 17, 2006

(87) PCT Pub. No.: WO2005/008812
PCT Pub. Date: Jan. 27, 2005

(65) Prior Publication Data
US 2006/0177739 A1   Aug. 10, 2006

(30) Foreign Application Priority Data

Jul. 17, 2003 (JP) ................ 2003-198630
Sep. 22, 2003 (JP) ................ 2003-330485
Oct. 30, 2003 (JP) ................ 2003-371358
Jan. 27, 2004 (JP) ................ 2004-017744

(51) Int. Cl.
H01M 4/13 (2010.01)
(52) U.S. Cl. .................... 429/218.1; 429/209
(58) Field of Classification Search ........... 429/218.1
See application file for complete search history.

(56) References Cited

U.S. PATENT DOCUMENTS
6,291,103 B1 * 9/2001 Park et al. ............ 429/231.95
(Continued)

FOREIGN PATENT DOCUMENTS
CN    1416189    * 5/2003
(Continued)

OTHER PUBLICATIONS
Chinese Office Action dated May 9, 2008 with an English translation.
(Continued)

*Primary Examiner* — Ula C Ruddock
*Assistant Examiner* — Jacob Marks
(74) *Attorney, Agent, or Firm* — McGinn IP Law Group, PLLC (57) ABSTRACT

A positive active material is provided which can inhibit side reactions between the positive electrode and an electrolyte even at a high potential and which, when applied to a battery, can improve charge/discharge cycle performance without impairing battery performances even in storage in a charged state. Also provided are: a process for producing the active material; a positive electrode for lithium secondary batteries which employs the active material; and a lithium secondary battery which has improved charge/discharge cycle performance while retaining intact battery performances even after storage in a charged state and which can exhibit excellent charge/discharge cycle performance even when used at a high upper-limit voltage. The positive active material comprises: base particles able to dope and release lithium ions; and an element in Group 3 of the periodic table present on at least part of that part of the base particles which is able to come into contact with an electrolyte. It is produced by, e.g., a process which comprises: producing base particles containing lithium and able to dope and release lithium ions; and then imparting an element in Group 3 of the periodic table to the base particles so that the element can be present on at least part of that part of the base particles which is able to come into contact with an electrolyte.

14 Claims, 1 Drawing Sheet

U.S. PATENT DOCUMENTS

| | | | |
|---|---|---|---|
| 6,294,292 B1 * | 9/2001 | Tsushima et al. | 429/231.8 |
| 6,569,569 B1 * | 5/2003 | Kweon et al. | 429/231.1 |
| 7,393,476 B2 * | 7/2008 | Shiozaki et al. | 252/521.2 |
| 2002/0141937 A1 * | 10/2002 | Howard et al. | 423/599 |
| 2003/0162090 A1 * | 8/2003 | Okada et al. | 429/137 |
| 2003/0211391 A1 * | 11/2003 | Cho et al. | 429/218.1 |

FOREIGN PATENT DOCUMENTS

| | | | |
|---|---|---|---|
| JP | 8-250120 | | 9/1996 |
| JP | 10-236826 | * | 2/1997 |
| JP | 2787153 | | 6/1998 |
| JP | 10-236826 | | 9/1998 |
| JP | 2000-48820 | | 2/2000 |
| JP | 2000-323126 | | 11/2000 |
| JP | 2001-185153 | | 7/2001 |
| JP | 2001-266879 | | 9/2001 |
| JP | 2002-15775 | | 1/2002 |
| JP | 2002-15776 | | 1/2002 |
| JP | 2002-151081 | | 5/2002 |
| JP | 2003-007299 | | 1/2003 |
| JP | 2003-500318 | | 1/2003 |
| JP | 2003-197255 | | 7/2003 |
| JP | 10-236826 | * | 8/2003 |
| WO | WO 03/044881 | * | 5/2003 |
| WO | WO 03044881 | * | 5/2003 |

OTHER PUBLICATIONS

Koyama, Yukinori, et al., "Crystal and electronic structures of super-structural Li1-x[Co1/3Ni1/3Mn1/3]O2(0<x<1)", Journal of Power Sources, vol. 119-121 (2003), pp. 644-648.

Chinese Office Action dated Aug. 3, 2007 with English translation.

Japanese Office Action dated Sep. 14, 2010 with an English translation.

Japanese Office Action dated Sep. 6, 2011 (with English translation).

* cited by examiner

POSITIVE ELECTRODE ACTIVE MATERIAL AND ITS MANUFACTURING METHOD, POSITIVE ELECTRODE FOR LITHIUM SECONDARY CELL USING SAME, AND LITHIUM SECONDARY CELL

TECHNICAL FIELD

The present invention relates to a positive active material which can be used in the positive electrodes of high-performance lithium batteries and to a process for producing the active material. The invention further relates to a positive electrode for lithium secondary batteries and a lithium secondary battery each employing the active material.

BACKGROUND ART

Non-aqueous electrolyte secondary batteries represented by lithium secondary batteries are extensively used as power sources for small portable terminals, mobile communication apparatus, etc. because these batteries have a high energy density and a high voltage can be taken out thereof. A lithium secondary battery has a positive electrode employing as a main component a positive active material able to release/dope lithium ions with charge/discharge, a negative electrode able to dope/undope lithium ions with charge/discharge, and an electrolyte comprising a lithium salt and a non-aqueous solvent.

Presently known positive active materials for lithium secondary batteries include: lithium-transition metal composite oxides having a layered structure and having a composition represented by $LiMO_2$ (M is a transition metal element); lithium-transition metal composite oxides having a spinel structure and having a composition represented by $LiM_2O_4$ (M is a transition metal element); and lithium-transition metal-phosphoric acid compounds having a composition represented by $LiMPO_4$ (M is a transition metal element). Of these, $LiCoO_2$, which is one of the lithium-transition metal composite oxides having a layered structure and having a composition represented by $LiMO_2$ (M is a transition metal element), is in extensive use as a positive active material for lithium secondary batteries especially for portable communication appliances because it has a high energy density.

Various attempts have been proposed in which the surface of an active material is modified with an element of a different kind to improve performance. In patent documents 1 to 4 is described a method in which the surface of an active material is coated with aluminum to thereby improve electron conductivity. However, this method has been insufficient in inhibiting the oxidative decomposition of electrolytes on a positive electrode, although it surely improves the electron conductivity of the particle surface.

In patent document 5 is described a positive-electrode material obtained by forming a metallic conductive layer comprising indium, magnesium, aluminum, barium, strontium, calcium, zinc, tin, bismuth, cerium, or ytterbium on the surface of base particles. However, the deposition of a zero-valent metal on the surface has not always resulted in satisfactory cycle performance. This is presumed to be because the metallic conductive layer shows insufficient conformability to the expansion/contraction of the active-material particles with charge/discharge. Furthermore, for forming the metallic conductive layer on the surface, it is necessary to conduct a treatment in a reducing atmosphere as described in Examples given in that document. The treatment in such an atmosphere has posed a problem that the positive active material undergoes oxygen extraction therefrom, etc. and this is apt to disorder the crystal structure of the active material, resulting in reduced battery performances. Patent document 6 discloses an attempt to heighten heat resistance and electron conductivity by doping a surface part of Li—Mn—Ni—Co composite oxide base particles with a minute amount of an element of a different kind (Al, Mg, Ca, Sr, Y, or Yb) in such a degree as not to disorder the crystal structure. However, these techniques are insufficient for the modification of the active-material surface and failed to sufficiently improve battery performances. Incidentally, no statement is given in patent document 6 on how much the doping with these elements improves battery performances.

It is becoming known that a lithium-nickel-manganese-cobalt composite oxide obtained by displacing part of the nickel in $LiNiO_2$ by manganese and cobalt as other elements (see, for example, patent document 7) not only shows the same charge/discharge capacity as lithium-cobalt oxide and excellent charge/discharge cycle performance and storage performance but also shows better high-temperature stability in the last stage of charge than lithium-cobalt oxide and lithium-nickel oxide. That composite oxide is hence receiving attention as a positive active material which replaces lithium-cobalt oxide.

In patent document 8 is described a lithium ion secondary battery which employs a positive electrode containing a lithium-transition metal composite oxide and a negative electrode containing a carbon material, wherein the lithium-transition metal composite oxide is, for example, a layered lithium-nickel-manganese-cobalt composite oxide having a specific composition, and which is used at an upper-limit voltage of 4.15-4.4 V. However, it has been desired to further improve charge/discharge cycle performance.

[Patent Document 1] JP-A-08-102332
[Patent Document 2] JP-A-09-171813
[Patent Document 3] JP-A-2002-151077
[Patent Document 4] JP-A-2001-256979
[Patent Document 5] JP-A-2000-048820
[Patent Document 6] JP-A-2003-017052
[Patent Document 7] JP-A-2000-133262
[Patent Document 8] JP-A-2003-264006

Lithium secondary batteries have had a problem that the batteries, when allowed to stand in a charged state over long, deteriorate in battery properties such as discharge performance. This problem was conspicuous especially in lithium secondary batteries which had repeatedly undergone charge/discharge many times. The present inventors made investigations concerning a cause of that problem and, as a result, it was found that in lithium secondary batteries deteriorated in properties, the negative electrode employing a carbon material has an operating potential region which has shifted to the higher-potential side. From this finding, the inventors presumed the cause of the property deterioration to be as follows. Due to the potential applied to the positive electrode, the electrolyte present near the positive electrode decomposes to generate decomposition products consisting mainly of carbonic acid radicals. These acid radicals migrate toward the negative-electrode side to thereby form a coating film consisting mainly of carbonic acid radicals on the surface of the negative electrode to increase the negative-electrode impedance. This results in a substantial increase in negative-electrode potential and hence in the shifting of the negative-electrode operating potential region to the higher-potential side, and the positive-electrode operating potential region shifts to the higher-potential side accordingly. Because of this, a higher potential is imposed on the positive electrode and the phenomenon described above is further accelerated, resulting in enhanced deterioration of battery performances.

The invention has been achieved in view of the problem described above. An object thereof is to provide: a positive active material which can inhibit side reactions between the positive electrode and an electrolyte even at a high potential and which, when applied to a battery, can improve charge/discharge cycle performance without impairing battery performances even in storage in a charged state; a process for producing the active material; a positive electrode for lithium secondary batteries which employs the active material; and a lithium secondary battery which has improved charge/discharge cycle performance while retaining intact battery performances even after storage in a charged state. Another object is to provide a lithium secondary battery which can exhibit excellent charge/discharge cycle performance even when used at a high upper-limit voltage.

DISCLOSURE OF THE INVENTION

As a result of intensive investigations, the inventors have found that by depositing an element in Group 3 of the periodic table on the surface of a positive active material, side reactions between the positive electrode and an electrolyte can be inhibited even at a high potential and the problem described above can hence be eliminated. The invention has been thus achieved.

The technical constitutions of the invention and the effects and advantages thereof are as follows. It is, however, noted that the explanations on the mechanisms of the effects include presumptions and whether these explanations on the mechanisms are correct or not does not limit the scope of the invention.

Namely, the invention provides the following (1) to (16).

(1) A positive active material which comprises: base particles able to dope and release lithium ions; and an element in Group 3 of the periodic table present on at least part of that part of the base particles which is able to come into contact with an electrolyte.

(2) The positive active material as described under (1) above wherein the element in Group 3 is present as a chalcogen compound.

(3) The positive active material as described under (1) above wherein the element in Group 3 is present as an oxygen-containing compound.

(4) The positive active material as described under any one of (1) to (3) above wherein the base particles are $LiCoO_2$.

(5) The positive active material as described under any one of (1) to (3) above wherein the base particles are a lithium-transition metal composite oxide having an $\alpha$-$NaFeO_2$ type crystal structure and represented by the composite formula $Li_xMn_aNi_bCo_cO_d$ (wherein $0 \leq x \leq 1.3$, $a+b+c=1$, $|a-b| \leq 0.03$, $0 \leq c < 1$, and $1.7 \leq d \leq 2.3$).

(6) A process for producing the positive active material as described under any one of (1) to (3) above which comprises: producing base particles which contain lithium and are able to dope and release lithium ions; and then imparting an element in Group 3 of the periodic table to the base particles so that the element can be present on at least part of that part of the base particles which is able to come into contact with an electrolyte.

(7) A process for producing the positive active material as described under any one of (1) to (3) above which comprises: producing base particles which contain lithium and are able to dope and release lithium ions; and then mixing a solution which contains the base particles and the pH of which has been regulated by the addition of a lithium ion-containing alkalinity regulator with a "deposition reaction liquid" containing an element in Group 3 of the periodic table to thereby deposit a compound containing the Group 3 element on the base particles in the solution and impart the Group 3 element to the base particles so that the Group 3 element can be present on at least part of that part of the base particles which is able to come into contact with an electrolyte.

(8) The process for producing a positive active material as described under (7) above wherein the solution has been regulated so as to have a pH of 11-12 by the addition of the lithium ion-containing alkalinity regulator.

(9) The process for producing a positive active material as described under (7) above wherein the lithium ion-containing alkalinity regulator is an aqueous lithium hydroxide solution.

(10) The process for producing a positive active material as described under (6) above which comprises producing the base particles, subsequently depositing a compound containing the Group 3 element on at least part of that part of the base particles which is able to come into contact with an electrolyte, and then subjecting the base particles to a heat treatment.

(11) The process for producing a positive active material as described under (10) above wherein the deposition of the compound is conducted in a solution.

(12) The process for producing a positive active material as described under (10) above wherein the base particles are produced through a step including a heat treatment, and the heat treatment of the base particles on which a compound containing the Group 3 element has been deposited is conducted at a lower temperature than in the heat treatment in the production of the base particles.

(13) A positive electrode for lithium secondary batteries which contains the positive active material as described under any one of (1) to (3) above.

(14) A lithium secondary battery which has the positive electrode for lithium secondary batteries as described under (13) above, a negative electrode employing a negative-electrode material able to dope and undope lithium ions, and a non-aqueous electrolyte.

(15) The lithium secondary battery as described under (14) above which is for use at an upper-limit voltage of 4.3 V or higher.

(16) The lithium secondary battery as described under (15) above characterized in that the negative electrode contains a carbon material and employs the negative active material so that the electrochemical capacity of the lithium ions able to be doped by the negative active material is from 1.05 times to less than 1.50 times the electrochemical capacity of the lithium ions able to be released by the positive electrode when the battery is used at the upper-limit voltage.

The positive active material according to (1) above comprises base particles able to dope and release lithium ions and an element in Group 3 of the periodic table present on at least part of that part of the base particles which is able to come into contact with an electrolyte. Namely, the positive active material is one which comprises base particles able to dope and release lithium ions and in which an element in Group 3 of the periodic table has been deposited on part of the surface of the base particles or is present so as to cover the whole surface of the base particles. In this case, because of the "deposition of a Group 3 element" on the surface of the base particles, that part of the surface of the base particles on which the element had been deposited is prevented from coming into direct contact with an electrolyte. According to this constitution, the positive active material can be one which can inhibit side reactions between the positive electrode and an electrolyte even at a high potential and, when applied to a battery, can improve charge/discharge cycle performance without impairing battery performances even in storage in a charged state.

This is thought to be because the element in Group 3 of the periodic table, which is present on the surface of the base particles able to dope and release lithium ions, serves to prevent the base particles from coming into direct contact with an electrolyte and thereby inhibits the positive active material from reacting with the electrolyte. The reason why the element to be deposited should be an element in Group 3 of the periodic table has not been fully elucidated. However, the inventors presume that since Group 3 elements have a characteristic f-electron orbit, the state in which a compound of the Group 3 element is present on a positive electrode is characteristic in the inhibition of reactions with a liquid electrolyte.

The positive active material according to (2) above is characterized in that the element in Group 3 is present as a chalcogen compound. According to this constitution, the positive active material can be one which can inhibit side reactions between the positive electrode and an electrolyte even at a high potential and enables the fabrication of a lithium secondary battery more inhibited from deteriorating in battery properties.

It is preferred that the element in Group 3 be present as a chalcogen compound rather than in a zero-valent metal state. Although the reason for this has not been fully elucidated, it is presumed that those effects are related to the fact that the chalcogen compound of the Group 3 element has a characteristic form. Namely, in the case where the Group 3 element on the base particles is the zero-valent metal, this metal does not always conform sufficiently to the expansion/contraction (volume changes) of the base particles which occurs with charge/discharge, resulting in a possibility that the metal might separate from the base particles during repetitions of charge/discharge. In contrast, the Group 3 element in the form of a chalcogen compound is presumed to be sufficient in the conformability.

The positive active material according to (3) above is characterized in that the element in Group 3 is present as an oxygen-containing compound. According to this constitution, the positive active material can be one which can inhibit side reactions between the positive electrode and an electrolyte even at a high potential and enables the fabrication of a lithium secondary battery further inhibited from deteriorating in battery properties.

The positive active material according to (4) above is characterized in that the base particles are $LiCoO_2$. According to this constitution, the positive active material can be one which has a high energy density, can inhibit side reactions between the positive electrode and an electrolyte even at a high potential, and enables the fabrication of a lithium secondary battery inhibited from deteriorating in battery properties.

The positive active material according to (5) above is characterized in that the base particles are a lithium-transition metal composite oxide having an $\alpha$-$NaFeO_2$ type crystal structure and represented by the composite formula $Li_xMn_aNi_bCo_cO_d$ (wherein $0 \leq x \leq 1.3$, $a+b+c=1$, $|a-b| \leq 0.03$, $0 \leq c < 1$, and $1.7 \leq d \leq 2.3$). According to this constitution, the positive active material can be one which can further inhibit side reactions between the positive electrode and an electrolyte even at a high potential and enables the fabrication of a lithium secondary battery which is more inhibited from deteriorating in battery properties and further has excellent charge/discharge cycle performance.

The process for producing a positive active material according to (6) above comprises: producing base particles which contain lithium and are able to dope and release lithium ions; and then imparting an element in Group 3 of the periodic table to the base particles so that the element can be present on at least part of that part of the base particles which is able to come into contact with an electrolyte. According to this constitution, a positive active material can be produced which inhibits side reactions between the positive electrode and an electrolyte even at a high potential and enables the fabrication of a lithium secondary battery reduced in battery property deterioration.

Incidentally, when a positive active material to which a Group 3 element has been imparted is used in a lithium secondary battery, the positive active material has a lower discharge capacity per unit weight as compared with the case where the lithium-transition metal composite oxide to which the Group 3 element has not been imparted is used as a positive active material. However, in the course of intensive investigations made by the inventors on processes for producing under various conditions a positive active material having a Group 3 element imparted thereto, they utterly surprisingly found that the decrease in discharge capacity can be inhibited when the step of imparting a Group 3 element to base particles is conducted under specific conditions.

Namely, the process for producing a positive active material according to (7) above is a process for producing a positive active material which comprises: producing base particles which contain lithium and are able to dope and release lithium ions; and then mixing a solution which contains the base particles and the pH of which has been regulated by the addition of a lithium ion-containing alkalinity regulator with a "deposition reaction liquid" containing an element in Group 3 of the periodic table to thereby deposit a compound containing the Group 3 element on the base particles in the solution and impart the Group 3 element to the base particles so that the Group 3 element can be present on at least part of that part of the base particles which is able to come into contact with an electrolyte.

Furthermore, the process for producing a positive active material according to (8) above is characterized in that the solution has been regulated so as to have a pH of 11-12 by the addition of the lithium ion-containing alkalinity regulator.

Moreover, the process for producing a positive active material according to (9) above is characterized in that the lithium ion-containing alkalinity regulator is an aqueous lithium hydroxide solution.

According to such constitutions, use of the alkalinity regulator containing lithium cations is effective in inhibiting the discharge capacity of the positive active material from being reduced by the impartation of a Group 3 element to the base particles.

The inventors made intensive investigations on the reason why the use of an alkalinity regulator containing lithium ions is effective in inhibiting the discharge capacity of the positive active material from decreasing. As a result, it was found that when an alkalinity regulator containing sodium ions is used, the base particles change in metal element composition through the step of imparting a Group 3 element to the base surface. Namely, a phenomenon was observed in which the contents of manganese and lithium, among the elements constituting the base particles, decrease through the step. On the other hand, use of an alkalinity regulator containing lithium ions was found not to result in a decrease in the proportions of manganese and lithium.

From these findings, the inventors presume that the mechanism by which use of an alkalinity regulator containing lithium ions is effective in inhibiting the discharge capacity of the positive active material from decreasing is as follows. Namely, there may be a possibility that in the step of imparting a Group 3 element to the base surface, the lithium element in the crystal lattice might be released from the base particles in the solution containing the base particles as a result of an ion-exchange reaction. Because of this, an alkalinity regulator containing lithium ions is used as the alkalinity regulator to be added for the purpose of pH regulation. Use of this alkalinity regulator is thought to have attained the inhibition of the lithium element extraction caused by an ion-exchange reaction. It is thought that a positive active material inhibited from undergoing a decrease in discharge capacity is thus obtained. On the other hand, with respect to the mechanism by which use of the alkalinity regulator containing lithium ions further inhibits the extraction of the manganese element as a component of the base, there are many points still remaining unclear. It is, however, presumed that the manganese element extraction observed in the case of using an alkalinity regulator containing sodium ions is a phenomenon induced by the lithium element extraction caused by an ion-exchange reaction.

The process for producing a positive active material according to (10) above is characterized by comprising producing the base particles, subsequently depositing a compound containing the Group 3 element on at least part of that part of the base particles which is able to come into contact with an electrolyte, and then subjecting the base particles to a heat treatment.

According to this constitution, a positive active material can be advantageously produced which inhibits side reactions between the positive electrode and an electrolyte even at a high potential and enables the fabrication of a lithium secondary battery reduced in battery property deterioration.

The process for producing a positive active material according to (11) above is characterized in that the deposition of the compound is conducted in a solution.

According to this constitution, a positive active material can be more advantageously produced which inhibits side reactions between the positive electrode and an electrolyte even at a high potential and enables the fabrication of a lithium secondary battery reduced in battery property deterioration. The solution can comprise water or an organic compound in which water is soluble.

The process for producing a positive active material according to (12) above is characterized in that the base particles are produced through a step including a heat treatment, and the heat treatment of the base particles on which a compound containing the Group 3 element has been deposited is conducted at a lower temperature than in the heat treatment in the production of the base particles. According to this constitution, a positive active material can be even more advantageously produced which inhibits side reactions between the positive electrode and an electrolyte even at a high potential and enables the fabrication of a lithium secondary battery reduced in battery property deterioration. Although the reason for this has not been fully elucidated, it is presumed that the Group 3 element is inhibited from diffusing into the base and, hence, the constitution in which the element in Group 3 of the periodic table is present on at least part of the surface of the base particles is surely realized.

The positive electrode for lithium secondary batteries according to (13) above is characterized by containing the positive active material described under any of (1) to (3) above. According to this constitution, the positive electrode can be one which enables the fabrication of a lithium secondary battery having improved charge/discharge cycle performance while retaining intact battery performances even after storage in a charged state.

The lithium secondary battery according to (14) above is characterized by having the positive electrode for lithium secondary batteries as described under (13) above, a negative electrode employing a negative-electrode material able to dope and undope lithium ions, and a non-aqueous electrolyte. According to this constitution, the lithium secondary battery can be one which has improved charge/discharge cycle performance while retaining intact battery performances even after storage in a charged state.

The lithium secondary battery according to (15) above is characterized by being a lithium secondary battery to be used at an upper-limit voltage of 4.3 V or higher. According to this constitution, the positive electrode can be inhibited from undergoing side reactions with the electrolyte even at a high potential and, hence, the battery can be inhibited from suffering a decrease in discharge capacity even when repeatedly subjected to a charge/discharge cycle in which charge is conducted to a voltage higher than ordinary ones, e.g., to an upper-limit voltage of 4.3-4.6 V.

The lithium secondary battery according to (16) above is characterized in that the negative electrode contains a carbon material and employs the negative active material so that the electrochemical capacity of the lithium ions able to be doped by the negative active material is from 1.05 times to less than 1.50 times the electrochemical capacity of the lithium ions able to be released by the positive electrode when the battery is used at the upper-limit voltage. According to this constitution, the lithium secondary battery can be one which, even when charged to a voltage higher than ordinary ones, e.g., to an upper-limit voltage of 4.3-4.6 V, is inhibited from being deteriorated in battery performance by, e.g., the deposition of lithium metal on the negative electrode, and has excellent charge/discharge cycle performance.

BEST MODE FOR CARRYING OUT THE INVENTION

Positive Active Material

The positive active material according to the invention is an active material which comprises base particles able to dope and release lithium ions and an element in Group 3 of the periodic table present on at least part of that part of the base particles which is able to come into contact with an electrolyte, for the purpose of diminishing reactions between the positive active material, which has high chemical activity, and the electrolyte.

The term "element in Group 3 of the periodic table" herein means any of Sc, Y, the lanthanide elements, i.e., La, Ce, Pr, Nd, Pm, Sm, Eu, Gd, Tb, Dy, Ho, Er, Tm, Yb, and Lu, and the actinide elements. In particularly, Y, La, Ce, Gd, and Yb have been ascertained to bring about an excellent effect. Especially preferred are Y and Gd. Most preferred is Gd.

It is preferred that the element in Group 3 be present as a chalcogen compound rather than in a zero-valent metal state. In this case, the effect of inhibiting the decomposition of an electrolyte is presumed to be related to the fact that the chalcogen compound of the Group 3 element has a characteristic form. Namely, in the case where the Group 3 element on the base particles is the zero-valent metal, this metal does not always conform sufficiently to the expansion/contraction (volume changes) of the base particles which occurs with charge/discharge, resulting in a possibility that the metal might separate from the base particles during repetitions of charge/discharge. In contrast, the Group 3 element in the form of a chalcogen compound is presumed to be sufficient in the conformability.

Furthermore, for causing a zero-valent metal to be present on base particles, it is necessary to conduct a heat treatment in a reducing atmosphere such as, e.g., an inert gas, as described in patent document 2. However, when a heat treatment is conducted in a reducing atmosphere, atoms of the chalcogen as a component of the base particles are apt to separate from the particles during the heat treatment. For example, in the case of base particles having a composition represented by $Li_xMn_aNi_bCo_cO_2$ and having a layered rock salt type crystal structure, there is a possibility that oxygen atoms might separate from the base particles to cause a disordered composition, resulting in a positive active material having considerably reduced properties. In contrast, in the case where the Group 3 element to be caused to be present on base particles is a chalcogen compound, there is no need of conducting a heat treatment in a reducing atmosphere and, hence, this case is free from that problem. In this respect also, the Group 3 element preferably is a chalcogen compound.

Preferred chalcogen compounds of the Group 3 element are sulfur-containing compounds and oxygen-containing compounds. Most preferably, the Group 3 element is in the form of an oxygen-containing compound.

The base particles are not particularly limited. It is, however, preferred to use $LiCoO_2$ having an $\alpha$-$NaFeO_2$ structure, $LiNiO_2$, or an Li—Mn—Ni composite oxide or Li—Mn—Ni—Co composite oxide formed by displacing part of the nickel sites in an $LiNiO_2$ structure by manganese in a solid solution state or by manganese and cobalt in a solid solution state, respectively.

The base particles more preferably are ones which have a layered rock salt type crystal structure and have a composition represented by $Li_xMn_aNi_bCo_cO_2$ (a+b+c=1). Especially preferably, a/b=1.0. Use of such base particles gives a positive active material which not only sufficiently produces the effect of inhibiting reactions with an electrolyte on the positive electrode but also realizes a lithium secondary battery especially having excellent charge/discharge cycle performance. The reason for this has not been fully elucidated. However, it is presumed that use of the base particles in which a/b=1.0 enables a Group 3 element to tenaciously bond to the base particles and come to be present in a form having excellent conformability to the expansion/contraction of the base particles with charge/discharge. Actually, the relationship between a and b is $|a-b|\leq 0.03$ because of tolerances in raw-material feeding, etc.

It is preferred that after base particles which contain lithium and are able to dope and release lithium ions have been produced, the Group 3 element be imparted to at least part of that part of the base particles which is able to come into contact with an electrolyte. It is desirable that this impartation be conducted by deposition from a solution containing the Group 3 element.

A method in which the impartation of a Group 3 element to base particles is conducted by deposition from a solution is explained below with respect to, as an example, the case where the Group 3 element is gadolinium. First, base particles are placed in a reaction vessel and ion-exchanged water is added thereto. The resultant mixture is stirred while keeping the temperature thereof at from 40° C. to 50° C. It is desirable that the pH of the liquid be measured at this point of time. Subsequently, an alkalinity regulator is added thereto in such an amount that the pH of the liquid comes to be in the range of 11-12.

To regulate the pH of the liquid to 11-12 is important because values of the solution pH lower than 11 may result in lithium separation from the base particles. It is important that the pH of the liquid should be regulated so as not to become lower than at least the pH value measured earlier. Next, an aqueous solution of $Gd(NO_3)_3$ is added as a deposition reaction liquid. During this addition also, an alkalinity regulator containing lithium ions is suitably added so as to keep the pH of the liquid mixture at 11-12. Thus, a hydroxide of gadolinium is imparted to the base surface. After stirring, the resultant positive active material is separated from the liquid.

The alkalinity regulator is not particularly limited as long as the substance is alkaline. Use can be made of, for example, one containing sodium cations or one containing lithium cations. Of these, one containing lithium cations is preferred. For example, lithium hydroxide or lithium carbonate can be used. In particular, it is preferred to use lithium hydroxide because pH regulation to a value in the range of 11-12 is easy, because when the base particles are a compound containing lithium element, it is possible to inhibit lithium ingredient release from the base particles during the step of imparting a Group 3 element and, hence, the positive active material can be inhibited from suffering a capacity decrease, and because when the base particles are a compound containing manganese element, it is possible to inhibit manganese ingredient release from the base particles during the step of imparting a Group 3 element and, hence, the base particles can be inhibited from changing in composition. It is preferred to use the alkalinity regulator in the form of an aqueous solution.

The positive active material obtained is separated from the liquid by filtration and then washed to thereby remove the excess alkali ingredient present on the particle surface. This washing preferably is conducted while measuring the pH of the filtrate. Namely, the washing is conducted in such a manner that the pH of the filtrate does not become lower than the pH value of the liquid as measured at the time when ion-exchanged water was added to base particles and the resultant mixture was stirred. Thus, lithium extraction from the positive active material can be inhibited. Next, water is removed by a heat treatment. It is preferred that this heat treatment be conducted at a temperature lower than the sintering temperature used in producing the base, from the standpoint of preventing the mutual diffusion of a constituent element between the Group 3 element compound and the base. It is especially desirable to conduct the heat treatment at 150-700° C.

The amount of the Group 3 element to be deposited (=(weight of the Group 3 element in terms of oxide)/(weight of the base+weight of the Group 3 element in terms of oxide)× 100) is desirably from 0.05% by weight to 4% by weight. By regulating the deposition amount to 0.05% by weight or larger, the effect of improving the cycle characteristics of the battery can be sufficiently produced. By regulating the deposition amount to 4% by weight or smaller, the possibility of battery capacity decrease can be diminished.

The presence of a Group 3 element on at least part of that part of the base particles which is able to come into contact with an electrolyte may be ascertained by, e.g., EPMA or analysis with a TEM.

The positive active material desirably has an average particle size of 50 μm or smaller. It is especially desirable that the positive active material should have an average particle size of 10 μm or smaller for the purpose of improving the high-output characteristics of the battery.

The positive active material described above can be used in producing a positive electrode for lithium secondary batteries, for example, by the following method.

[Positive Electrode]

The positive electrode for lithium secondary batteries (hereinafter also referred to simply as positive electrode) which employs the positive active material obtained by the invention is one including the positive active material as a main component. It is produced preferably by preparing a positive composite by, e.g., a method in which the positive active material is kneaded together with a conductive material and a binder optionally further with a filler, applying or press-bonding this positive composite to a foil, lath, or the like as a current collector, and drying the positive composite at a temperature of about from 50° C. to 250° C. for about 2 hours. The content of the positive active material in the positive electrode is regulated to generally from 80% by weight to 99% by weight, preferably from 85% by weight to 97% by weight.

Incidentally, as the conductive material, binder, filler, and current collector, ones known in this technical field can be used in known manners.

[Lithium Secondary Battery]

The lithium secondary battery (hereinafter also referred to simply as "battery") including the positive electrode has the positive electrode, a negative electrode for lithium secondary batteries (hereinafter also referred to simply as "negative electrode"), and a non-aqueous electrolyte. In general, a separator for non-aqueous electrolyte batteries is interposed between the positive electrode and the negative electrode. Preferred examples of the non-aqueous electrolyte include a form comprising a non-aqueous solvent and an electrolyte salt contained therein.

As the non-aqueous electrolyte, negative electrode, and separator, known ones whose use in lithium batteries and the like has been proposed can generally be used in known manners. As the non-aqueous electrolyte can be used a suitably selected one such as, e.g., a liquid electrolyte (electrolytic liquid), a gel electrolyte, or an (inorganic or organic) solid electrolyte.

The negative active material to be used in the invention preferably is a carbon material able to dope/undope lithium. Examples thereof include graphites, hard carbon, low-temperature-sintered carbon, and amorphous carbon. Graphites (e.g., artificial graphite and natural graphite) are especially preferred of carbon materials because graphites have an operating potential very close to that of lithium metal, can realize charge/discharge at a high operating voltage, and in the case of employing a lithium salt as an electrolyte salt, can inhibit self-discharge and reduce irreversible capacity in charge/discharge.

Values of properties of advantageously usable graphites are shown below. These property values can be determined through analysis by, e.g., X-ray diffractometry.

Lattice spacing (d002): 0.333-0.350 nm
Crystallite size in a-axis direction, La: $\geqq 20$ nm
Crystallite size in c-axis direction, Lc: $\geqq 20$ nm
True density: 2.00-2.25 g/cm$^3$ It is possible to modify a graphite by adding thereto a metal oxide, such as a tin oxide or silicon oxide, phosphorus, boron, amorphous carbon, or the like. A graphite or the like into which lithium has been inserted beforehand by electrochemical reduction can also be used as a negative active material.

The lithium secondary battery according to the invention is produced preferably by superposing a separator, positive electrode, and a negative electrode, infiltrating a non-aqueous electrolyte thereinto, for example, before or after the superposition, and finally sealing the case with a sheathing material. In the case of a battery employing a power generating element comprising the positive electrode and a negative electrode which have been stacked and wound together with separators interposed therebetween, it is preferred that a non-aqueous electrolyte be impregnated into the power generating element before and after the winding. Although the infiltration may be conducted at ordinary pressure, the vacuum impregnation method or the pressure impregnation method can be used.

As the material of the sheath of the battery, one known in this technical field can be used in a known manner.

In designing/producing a lithium secondary battery, it is a usual practice for persons skilled in the art to obtain OCV curves of the positive active material and negative active material beforehand. From OCV curves obtained through, e.g., intermittent discharge, the relationship between the amount of lithium ions which can be doped or released/undoped (depth of charge/discharge) and an open-circuit potential can be known. Based on this, a battery is designed while taking account of a capacity balance between the positive electrode and negative electrode. The lithium ion battery according to the invention is preferably designed so that the capacity of the negative electrode is from 1.05 times to less than 1.50 times the capacity of the positive electrode as measured when the battery is used up to an upper-limit voltage. In case where the capacity of the negative electrode is lower than 1.05 times the capacity of the positive electrode, this is a cause of a considerable decrease in charge/discharge cycle performance, for example, because the lithium ions released from the positive electrode during charge cannot be wholly accepted by the negative electrode, resulting in lithium deposition on the negative electrode. Conversely, in case where the capacity of the negative electrode is 1.5 times or higher, a larger part of the negative electrode is not utilized and this simply results in decreases in weight energy density and volume energy density. In addition, when the negative electrode in this case employs a carbon material, a lithium ion doping region where the amount of self-discharge is relatively large is used and this is causative of a decrease in battery storage performance. From this standpoint, the capacity of the negative electrode is preferably at least 1.05 times, more preferably at least 1.15 times the capacity of the positive electrode and is preferably up to 1.30 times, more preferably up to 1.20 times the capacity of the positive electrode.

The battery according to the invention can be designed to have a higher upper-limit working voltage than related-art batteries. It should hence be noted that the value of discharge capacity per unit weight of the positive active material (mAh/g) for use as a basis of calculating the capacity balance should be one which corresponds to the upper-limit working voltage for the battery. It is a matter of course that the value used as a calculation basis for conventional batteries should not be used as it is. Specifically, in the case where a battery having a working-voltage upper limit of, for example, 4.5 V is designed, that value of discharge capacity of the positive active material which corresponds to a potential of 4.6 V should be used because the positive-electrode potential is 4.6 V when the negative-electrode potential as measured when the battery voltage is 4.5 V is 0.1 V. For example, the value of discharge capacity corresponding to a positive active material potential of 4.3 V used in designing a battery having a working-voltage upper limit of 4.2 V should not be used as it is.

BRIEF DESCRIPTION OF THE DRAWING

In the drawing, numeral 1 denotes a power generating element, 2 a sheath, 3A a positive terminal, 3B a negative terminal, and 10 a flat type lithium secondary battery.

EXAMPLES

The invention will be explained below in more detail by reference to Examples, but the invention should not be construed as being limited by the following statement.

(Production of Base Particles)

Base particles having the composition $LiMn_{0.167}Ni_{0.167}Co_{0.667}O_2$ were produced in the following manner. Into a 5-L closed type reactor equipped with a draft tube was introduced 3.5 L of water. Thereto was added 32% aqueous sodium hydroxide solution in such an amount as to result in a pH of 11.6±0.1. The contents were stirred at a rotation speed of 1,200 rpm with a stirrer having paddle type stirring blades, and the temperature of the solution in the reactor was kept at 50° C. with an external heater. Furthermore, argon gas was bubbled into the solution in the reactor to remove the oxygen dissolved in the solution.

On the other hand, an aqueous solution containing transition metal elements dissolved therein was prepared as a raw-material solution. It was obtained by mixing an aqueous manganese sulfate pentahydrate solution, an aqueous nickel sulfate hexahydrate solution, an aqueous cobalt sulfate heptahydrate solution, and an aqueous hydrazine monohydrate solution so as to result in a manganese concentration of 0.44 mol/L, nickel concentration of 0.44 mol/L, cobalt concentration of 0.879 mol/L, and hydrazine concentration of 0.0020 mol/L.

The raw-material solution was continuously dropped into the reactor at a flow rate of 3.17 mL/min. Simultaneously therewith, 12 mol/L ammonia solution was dropwise added at a flow rate of 0.22 mL/min and mixed with the contents. After initiation of the dropwise addition, 32% aqueous sodium hydroxide solution was intermittently introduced into the reactor so that the pH of the solution in the reactor was kept constant at 11.4±0.1. Furthermore, the temperature of the solution in the reactor was regulated so as to be kept constant at 50° C. by intermittently using a heater. Argon gas was bubbled directly into the liquid so that the atmosphere in the reactor became a reducing atmosphere. Moreover, a flow pump was used to discharge a slurry from the system so that the amount of the solution in the reactor was always kept constant at 3.5 L.

After 60 hours had passed since initiation of the dropwise addition, a slurry of an Ni—Mn—Co composite oxide as a product of crystallization reaction was collected over a period of 5 hours while continuing the dropwise addition. The slurry collected was washed with water, filtered, and dried at 80° C. overnight. Thus, a dry powder of a coprecipitated Ni—Mn—Co precursor was obtained.

The coprecipitated Ni—Mn—Co precursor powder obtained was sieved to recover particles smaller than 75 μm. A powder of lithium hydroxide monohydrate was mixed therewith by means of a planetary kneader in such a weighed amount as to result in Li/(Ni+Mn+Co)=1.0. This mixture was charged into a pot made of alumina. Using an electric furnace, the mixture charged was heated to 850° C. at a heating rate of 100° C./hr, held at the temperature of 850° C. for 15 hours, subsequently cooled to 200° C. at a cooling rate of 100° C./hr, and then allowed to cool, while passing dry air. The mixture was thus sintered. The resultant particles were sieved to obtain a powder composed of particles not larger than 75 μm. Analysis by X-ray diffractometry revealed that the powder thus obtained had a single-phase structure belonging to the space group R3-m. As a result of ICP emission spectroanalysis, the composition $LiMn_{0.167}Ni_{0.167}Co_{0.667}O_2$ was ascertained. This powder had a BET surface area of 0.8 m²/g and an average particle diameter (D50) of 9.8 μm.

With respect to expressions of the space group, the numeral "3" in "R3 m" should originally bear a bar (–) affixed thereover. For convenience, however, the expression "R3-m" is used for showing the same meaning in this description.

(Impartation of Group 3 Element to Base Particle Surface)

Into a 1-L reaction vessel was introduced 50 g of the base particles obtained above. Ion-exchanged water was introduced thereinto in such an amount as to result in a total amount of 500 g. Thus, a suspension having a solid proportion of 10% by weight was produced.

On the other hand, $Gd(NO_3)_3.4H_2O$ (3.85 g) was dissolved in 100 mL of ion-exchanged water to prepare an aqueous solution (hereinafter referred to also as "deposition reaction liquid"). In preparing the solution, the amount of the gadolinium compound (amount of the Group 3 element) to be contained in the deposition reaction liquid was determined so that it was 1.5% by weight in terms of $Gd_2O_3$ amount based on the total weight of the base particles and the compound.

The suspension was stirred at a rotation speed of 450 rpm with a stirring rod having paddle blades, and the temperature of the suspension was kept constant at 40° C. with an external heater. The pH of the suspension in this stage was 10.8. A 10% by weight aqueous solution of LiOH was then introduced as an alkalinity regulator to thereby regulate the pH of the suspension to 11.0±0.1.

Subsequently, the deposition reaction liquid was dropped into the suspension at a rate of 3 mL/min. Simultaneously with the dropping, the alkalinity regulator was intermittently introduced so as to keep the pH of the suspension constant at 11.0±0.1. After completion of the dropwise addition of the whole deposition reaction liquid, the alkalinity regulator was introduced while keeping the temperature of the suspension at 40° C. to thereby heighten the pH of the suspension to 12.0±0.1. The suspension in this state was held for 30 minutes. Subsequently, the suspension was filtered, and the particles were washed with ion-exchanged water until the pH of the resultant filtrate decreased to 10.9. The solid obtained by filtration was dried at 110° C. and then heat-treated at 400° C. for 5 hours in an air stream. The particles obtained were sieved to obtain a powder composed of particles not larger than 75 μm.

The values of the BET surface area and average particle diameter (D50) of the treated powder were the same as the values of the untreated base particles. The state of the Group 3 element imparted was analyzed by X-ray photoelectron spectroscopy (XPS). As a result, a 4d spectral line was observed at around 143.8 eV. This was completely coincident with a spectral line observed separately with commercial $Gd_2O_3$. These results indicated that the Group 3 element imparted was present in the form of an oxide. Next, the treated powder was analyzed for composition by ICP emission spectroanalysis. As a result, the amount of the Group 3 element compound imparted was found to be 0.6% by weight in terms of $Gd_2O_3$ amount based on the weight of the whole base. The composition of the base was found to be $Li_{1.01}Mn_{0.167}Ni_{0.167}Co_{0.67}O_2$. As a result of X-ray diffractometry (XRD), no diffraction line attributable to $Gd_2O_3$ was observed. Furthermore, no difference in lattice constant was observed between the untreated base particles and the treated powder. It was hence ascertained that the Group 3 element imparted had not been incorporated as a dopant in the base but was present on the surface of the base particles. Thus, the positive active material according to Example 3 was produced.

In the other Examples and the Comparative Examples, Group 3 elements (and aluminum in Comparative Examples) were imparted to base particles in the same manner as in the Example given above, except that the conditions shown in Table 1 were changed. Namely, an investigation was made on the case where base particles made of $LiCoO_2$ were used in place of ones whose composition was $Li_{1.01}$ $Mn_{0.167}Ni_{0.167}Co_{0.667}O_2$. Furthermore, an investigation was made on the case where 10% by weight aqueous NaOH solution was used as an alkalinity regulator in place of 10% by weight aqueous LiOH solution. Moreover, investigations were made on the case where Y, Zr, La, Ce, or Yb was used as a Group 3 element in place of Gd, and on the case where Al was used in Comparative Examples in place of Gd. Incidentally, in the case where Y, Zr, La, Ce, or Yb was used, the salt of each Group 3 element to be dissolved in ion-exchanged water for preparing a deposition reaction liquid was a hydrated nitrate of the element. In the case where Al was used, $Al(NH_4)(SO_4)_2 \cdot 12H_2O$ was employed. Furthermore, with respect to the temperature in the heat treatment to be conducted after the impartation of a Group 3 element, an investigation was made on the case where a temperature of 150° C., 700° C., or 800° C. was used in place of 400° C. Moreover, an investigation was made on the case where the concentration of the Group 3 element in a deposition reaction liquid was changed. As a result, in all the Examples in which Group 3 elements were imparted, it was ascertained that the Group 3 elements imparted were present in the form of an oxide, and that the Group 3 elements imparted had not bee incorporated as a dopant in the base but were present on the surface of the base particles.

(Production of Positive Electrode for Lithium Secondary Battery)

A positive active material, acetylene black, and poly(vinylidene fluoride) (PVdF) were mixed together in a ratio of 90:5:5 by weight. N-Methylpyrrolidone was added thereto as a dispersion medium and the resultant mixture was kneaded to disperse the ingredients. Thus, a coating fluid was prepared. Incidentally, the PVdF used was in the form of a liquid containing the solid dissolved/dispersed therein, and the amount thereof was on a solid weight basis. The coating fluid was applied to an aluminum foil current collector having a thickness of 20 μm to produce a positive electrode for lithium secondary batteries. This positive electrode for lithium secondary batteries was subjected to a constant-voltage application test.

(Constant-Voltage Application Test)

A constant-voltage application test was conducted in order to evaluate the amount of a positive active material reacting with an electrolyte at a high potential. The battery used for this test employed: a negative electrode plate obtained by bonding a lithium metal foil having a thickness of 40 μm to a copper foil current collector having a thickness of 10 μm; an electrolyte obtained by dissolving $LiPF_6$ in a concentration of 1 mol/L in a solvent prepared by mixing ethylene carbonate and diethyl carbonate in a ratio of 70:30 by volume; and a separator which was a microporous polypropylene film to which improved electrolyte retentivity had been imparted by surface modification with a polyacrylate.

A constant voltage of 4.3 V was continuously applied to the two terminals of this battery for 100 hours at the most, provided that the constant voltage was changed to 4.4 V in some evaluation tests. During this voltage application, the value of current flowing through the terminals was recorded and the integrated ampere-hour capacity which had flowed through the terminals was recorded with a coulometer connected to a circuit with the lapse of time. For the purpose of avoiding using measurement results including the ampere-hour capacity generated by a reaction in which lithium ions were released from the positive active material, the record for the 50-hour period from test initiation, in which the release reaction terminated, was not evaluated. The integrated ampere-hour capacity for the period from the time when 50 hours had passed since initiation of the constant-voltage application to the time when 100 hours had passed since then was converted to the integrated ampere-hour capacity per hour. The value obtained by dividing this integrated ampere-hour capacity by the weight of the positive active material in the positive electrode was taken as the floating integrated ampere-hour capacity (μAh/g). Consequently, the floating integrated ampere-hour capacity thus determined is thought to be attributable to side reactions between the positive active material and the electrolyte. The smaller the value of this floating integrated ampere-hour capacity, the less the positive active material reacts with the electrolyte.

With respect to some Examples and Comparative Examples, the methods of producing the positive active materials, conditions for the constant-voltage application tests, and the corresponding results of the constant-voltage application tests are shown in Tables 1 to 6.

TABLE 1

| | Composition of base | Kind of element imparted | Alkalinity regulator | Amount of element to be imparted in deposition reaction liquid (oxide amount) (wt %) | Amount imparted (oxide amount) (wt %) | Temperature for heat treatment after impartation (° C.) | Voltage value in constant-voltage application test (V) | Floating integrated ampere-hour capacity (μAh/g) |
|---|---|---|---|---|---|---|---|---|
| Example 1 | $LiCoO_2$ | Gd | LiOH | 1.5 | 0.6 | 400 | 4.3 | 49.1 |
| Example 2 | $LiCoO_2$ | Gd | NaOH | 1.5 | 0.6 | 400 | 4.3 | 52.2 |
| Comparative Example 1 | $LiCoO_2$ | none | — | — | — | — | 4.3 | 71.9 |

TABLE 2

|  | Composition of base | Kind of element imparted | Alkalinity regulator | Amount of element to be imparted in deposition reaction liquid (oxide amount) (wt %) | Amount imparted (oxide amount) (wt %) | Temperature for heat treatment after impartation (° C.) | Voltage value in constant-voltage application test (V) | Floating integrated ampere-hour capacity (μAh/g) |
|---|---|---|---|---|---|---|---|---|
| Example 3 | $LiMn_{0.167}Ni_{0.167}Co_{0.667}O_2$ | Gd | LiOH | 1.5 | 0.6 | 400 | 4.3 | 10.6 |
| Example 4 | $LiMn_{0.167}Ni_{0.167}Co_{0.667}O_2$ | Gd | NaOH | 1.5 | 0.6 | 400 | 4.3 | 11.3 |
| Comparative Example 2 | $LiMn_{0.167}Ni_{0.167}Co_{0.667}O_2$ | none | — | — | — | — | 4.3 | 32.7 |

TABLE 3

|  | Composition of base | Kind of element imparted | Alkalinity regulator | Amount of element to be imparted in deposition reaction liquid (oxide amount) (wt %) | Amount imparted (oxide amount) (wt %) | Temperature for heat treatment after impartation (° C.) | Voltage value in constant-voltage application test (V) | Floating integrated ampere-hour capacity (μAh/g) |
|---|---|---|---|---|---|---|---|---|
| Example 3 | $LiMn_{0.167}Ni_{0.167}Co_{0.667}O_2$ | Gd | LiOH | 1.5 | 0.6 | 400 | 4.3 | 10.6 |
| Example 5 | $LiMn_{0.167}Ni_{0.167}Co_{0.667}O_2$ | Y | LiOH | 2 | unmeasured | 400 | 4.3 | 13.33 |
| Example 6 | $LiMn_{0.167}Ni_{0.167}Co_{0.667}O_2$ | La | LiOH | 2 | unmeasured | 400 | 4.3 | 25.36 |
| Example 7 | $LiMn_{0.167}Ni_{0.167}Co_{0.667}O_2$ | Ce | LiOH | 3 | 2.8 | 400 | 4.3 | 29.4 |
| Example 8 | $LiMn_{0.167}Ni_{0.167}Co_{0.667}O_2$ | Yb | LiOH | 3 | 2.5 | 400 | 4.3 | 30.5 |
| Comparative Example 2 | $LiMn_{0.167}Ni_{0.167}Co_{0.667}O_2$ | none | — | — | — | — | 4.3 | 32.7 |
| Comparative Example 3 | $LiMn_{0.167}Ni_{0.167}Co_{0.667}O_2$ | Al | LiOH | 3 | 2.5 | 400 | 4.3 | 36.2 |

TABLE 4

|  | Composition of base | Kind of element imparted | Alkalinity regulator | Amount of element to be imparted in deposition reaction liquid (oxide amount) (wt %) | Amount imparted (oxide amount) (wt %) | Temperature for heat treatment after impartation (° C.) | Voltage value in constant-voltage application test (V) | Floating integrated ampere-hour capacity (μAh/g) |
|---|---|---|---|---|---|---|---|---|
| Example 9 | $LiMn_{0.167}Ni_{0.167}Co_{0.667}O_2$ | Yb | LiOH | 3 | 2.5 | 150 | 4.3 | 30.3 |
| Example 8 | $LiMn_{0.167}Ni_{0.167}Co_{0.667}O_2$ | Yb | LiOH | 3 | 2.5 | 400 | 4.3 | 30.5 |
| Example 10 | $LiMn_{0.167}Ni_{0.167}Co_{0.667}O_2$ | Yb | LiOH | 3 | 2.5 | 700 | 4.3 | 27.1 |
| Example 11 | $LiMn_{0.167}Ni_{0.167}Co_{0.667}O_2$ | Yb | LiOH | 3 | 2.5 | 800 | 4.3 | 31.9 |
| Comparative Example 2 | $LiMn_{0.167}Ni_{0.167}Co_{0.667}O_2$ | none | — | — | — | — | 4.3 | 32.7 |

TABLE 5

| | Composition of base | Kind of element imparted | Alkalinity regulator | Amount of element to be imparted in deposition reaction liquid (oxide amount) (wt %) | Amount imparted (oxide amount) (wt %) | Temperature for heat treatment after impartation (° C.) | Voltage value in constant-voltage application test (V) | Floating integrated ampere-hour capacity (µAh/g) |
|---|---|---|---|---|---|---|---|---|
| Example 12 | $LiMn_{0.167}Ni_{0.167}Co_{0.667}O_2$ | Yb | LiOH | 0.01 | unmeasured | 400 | 4.3 | 32.3 |
| Example 13 | $LiMn_{0.167}Ni_{0.167}Co_{0.667}O_2$ | Yb | LiOH | 0.1 | unmeasured | 400 | 4.3 | 30.6 |
| Example 8 | $LiMn_{0.167}Ni_{0.167}Co_{0.667}O_2$ | Yb | LiOH | 3 | 2.5 | 400 | 4.3 | 30.5 |
| Example 14 | $LiMn_{0.167}Ni_{0.167}Co_{0.667}O_2$ | Yb | LiOH | 5 | unmeasured | 400 | 4.3 | 30 |
| Comparative Example 2 | $LiMn_{0.167}Ni_{0.167}Co_{0.667}O_2$ | none | — | — | — | — | 4.3 | 32.7 |

TABLE 6

| | Composition of base | Kind of element imparted | Alkalinity regulator | Amount of element to be imparted in deposition reaction liquid (oxide amount) (wt %) | Amount imparted (oxide amount) (wt %) | Temperature for heat treatment after impartation (° C.) | Voltage value in constant-voltage application test (V) | Floating integrated ampere-hour capacity (µAh/g) |
|---|---|---|---|---|---|---|---|---|
| Example 15 | $LiMn_{0.167}Ni_{0.167}Co_{0.667}O_2$ | Yb | LiOH | 3 | 2.5 | 400 | 4.4 | 50.7 |
| Comparative Example 4 | $LiMn_{0.167}Ni_{0.167}Co_{0.667}O_2$ | none | — | — | — | — | 4.4 | 63 |
| Comparative Example 5 | $LiMn_{0.167}Ni_{0.167}Co_{0.667}O_2$ | Al | LiOH | 3 | 2.5 | 400 | 4.4 | 84.6 |

Table 1 summarizes the Examples and Comparative Example in which commercial $LiCoO_2$ had been used as base particles. It can be seen that in Examples 1 and 2, in which a Group 3 element had been imparted, the values of floating integrated ampere-hour capacity were lower than in Comparative Example 1, in which no Group 3 element had been imparted, showing that the positive active materials were inhibited from reacting with the electrolyte. In particular, it can be seen that the effect of inhibiting the positive active material from reacting with the electrolyte in Example 1, in which an aqueous LiOH solution had been used as the alkalinity regulator in the step of imparting a Group 3 element to the surface of base particles, was higher than in Example 2, in which an aqueous NaOH solution had been used as the alkalinity regulator.

Table 2 summarizes the Examples and Comparative Example which were the same as those shown in Table 1, except that $LiMn_{0.167}Ni_{0.167}Co_{0.667}O_2$ was used as base particles in place of $LiCoO_2$. It can be seen that in this case also, the positive active materials were inhibited from reacting with the electrolyte by the impartation of a Group 3 element. It can be further seen that the effect of inhibiting the positive active material from reacting with the electrolyte in Example 3, in which an aqueous LiOH solution had been used as the alkalinity regulator, was higher than in Example 4, in which an aqueous NaOH solution had been used as the alkalinity regulator. Furthermore, the following was surprisingly found. In the case shown in Table 1, in which $LiCoO_2$ had been used as base particles, the amount reacted with the liquid electrolyte had been reduced by about 40% as compared with the case where no Group 3 element had been imparted. In contrast, in the case shown in Table 2, in which $LiMn_{0.167}Ni_{0.167}Co_{0.667}O_2$ had been used as base particles, the amount reacted with the liquid electrolyte not only was small in itself but also had been reduced by as large as about 70% as compared with the case where no Group 3 element had been imparted. It can be seen from these results that the effect of inhibiting reactions with the liquid electrolyte, which is attained by the impartation of a Group 3 element to base particles, is especially remarkable when a lithium-transition metal composite oxide having an α-$NaFeO_2$ type crystal structure and represented by the composite formula $Li_xM-n_aNi_bCo_cO_d$ (wherein $0 \leq x \leq 1.3$, $a+b+c=1$, $|a-b| \leq 0.03$, $0 \leq c < 1$, and $1.7 \leq d \leq 2.3$) is selected as the base particles.

Table 3 summarizes an experiment conducted in the same manner, except that the kind of the Group 3 element to be imparted was changed. Although the amount of the impartation element in the deposition reaction liquid differs among the Examples, this reflects the results of a selection for each element of conditions under which the floating integrated ampere-hour capacity is minimal. The results given in Table 3 show the following. With respect to the kind of Group 3 element, yttrium and gadolinium are especially preferred and gadolinium is the most preferred. On the other hand, Comparative Example 3, in which aluminum had been used in place of a Group 3 element, gave results in which the floating integrated ampere-hour capacity was larger, rather than smaller, than in Comparative Example 2, in which no Group 3 element had been imparted.

Table 4 summarizes an experiment conducted in the same manner, except that ytterbium was used as a Group 3 element in a constant impartation amount and that the temperature for the heat treatment after impartation was changed. It can be seen from the results thereof that temperatures not lower than 150° C. suffice for the heat treatment after the Group 3 element impartation. By regulating the temperature for the heat treatment after Group 3 element impartation to 800° C. or lower, the effect of the invention can be sufficiently produced. Furthermore, the regulation of the temperature for the heat treatment after Group 3 element impartation to 800° C. or lower is effective in avoiding the possibility that doping of the base particles with a compound of the Group 3 element, excessive particle growth of a compound of the Group 3 element, or the like might occur to make the effect of inhibiting direct contact with the electrolyte by a Group 3 element compound insufficient. It can be further seen that the temperature for the heat treatment after Group 3 element impartation is more preferably 700° C. or lower.

Table 5 summarizes an experiment conducted in the same manner, except that ytterbium was used as a Group 3 element and the heat treatment after impartation was conducted at a constant temperature (400° C.) and that the amount of the Group 3 element to be imparted was changed. It can be seen from the results thereof that the larger the amount of the Group 3 element imparted, the more the reactions with the electrolyte at a high potential were inhibited. It should, however, be noted that since too large impartation amounts of the Group 3 element tend to reduce battery performances, the amount thereof is preferably 5% by weight or smaller, more preferably 3% by weight or smaller. It can also be seen that as long as the amount of the Group 3 element imparted is 0.1% by weight or larger, a sufficient effect is obtained.

Table 6 summarizes an experiment conducted in the same manner, except that the voltage in the constant-voltage application test was changed to a higher value of 4.4 V. It can be clearly seen from the results thereof that at 4.4 V also, reactions with the electrolyte at a high potential were sufficiently inhibited.

(Determination of OCV Curve)

Prior to the fabrication of lithium secondary batteries employing a carbon material in the negative electrode, an OCV curve of the positive active material to be used in each battery was precisely determined. The positive electrode for lithium secondary batteries was used as a working electrode to fabricate a three-terminal battery employing the non-aqueous electrolyte described above. Lithium metal was used as the counter electrode and the working electrode. This three-terminal battery was used to obtain an OCV curve by a known method and, from this OCV curve, the electrochemical capacities of the positive active material (mAh/g) respectively corresponding to working electrode potentials of 4.3 V, 4.5 V, and 4.7 V versus the reference electrode were determined.

(Fabrication of Lithium Secondary Battery Employing Carbon Material in Negative Electrode)

A positive active material, acetylene black, and poly(vinylidene fluoride) (PVdF) were mixed together in a ratio of 90:5:5 by weight. N-Methylpyrrolidone was added thereto as a dispersion medium and the resultant mixture was kneaded to disperse the ingredients. Thus, a coating fluid was prepared. Incidentally, the PVdF used was in the form of a liquid containing the solid dissolved/dispersed therein, and the amount thereof was on a solid weight basis. The coating fluid was applied to each side of an aluminum foil current collector having a thickness of 20 μm in such an amount as to result in a total thickness of 100 μm. Thus, a positive-electrode sheet was produced. This positive-electrode sheet was cut into a size having a width of 61 mm and a length of 445 mm. The positive active material in a sheet end part was removed, and a positive terminal 3A made of aluminum and having a thickness of 100 μm and a width of 3 mm was attached to the end part by ultrasonic welding. Thus, a positive electrode plate was produced.

A carbon material (artificial graphite; particle diameter, 6 μm) as a negative active material, a styrene/butadiene rubber as a binder, and the sodium salt of carboxymethyl cellulose as a thickener were mixed together in a ratio of 97:2:1 by weight. The resultant mixture was kneaded together with purified water to obtain a coating fluid. This coating fluid was applied to each side of a copper foil current collector having a thickness of 10 μm to produce a negative-electrode sheet. This negative-electrode sheet was cut into a size having a width of 63 mm and a length of 460 mm. The negative active material in a sheet end part was removed, and a negative nickel terminal 3B having a thickness of 100 μm and a width of 3 mm was attached to the end part by resistance welding. Thus, a negative electrode plate was produced.

In producing the positive-electrode sheet and the negative-electrode sheet, the amounts of the coating fluids to be applied to the current collectors were suitably regulated so that the electrochemical capacities per unit area of the positive electrode and negative electrode became design values for each battery.

Namely, for each of a battery for an upper-limit voltage of 4.2 V, a battery for an upper-limit voltage of 4.4 V, and a battery for an upper-limit voltage of 4.6 V, the electrochemical capacities were designed so that the electrochemical capacity of the negative electrode was 1.20 times the electrochemical capacity of the positive electrode. For attaining this, the following electrochemical capacity values were used so as to design the batteries to have a carbon negative-electrode potential in a discharge termination state of about 0.1 V:

for calculating the design capacity of the positive electrode for use in the battery for an upper-limit voltage of 4.2 V, that value of electrochemical capacity which corresponded to a potential of 4.3 V and had been determined from the OCV curve of the positive active material for use in the battery was used as a basis of the calculation;

for calculating the design capacity of the positive electrode for use in the battery for an upper-limit voltage of 4.4 V, that value of electrochemical capacity which corresponded to a potential of 4.5 V and had been determined from the OCV curve of the positive active material for use in the battery was used as a basis of the calculation; and for calculating the design capacity of the positive electrode for use in the battery for an upper-limit voltage of 4.6 V, that value of electrochemical capacity which corresponded to a potential of 4.7 V and had been determined from the OCV curve of the positive active material for use in the battery was used as a basis of the calculation.

Thus, the electrochemical capacity of the negative electrode to be used in each battery was regulated so as to be 1.20 times the electrochemical capacity of the corresponding positive electrode.

Figure 1:
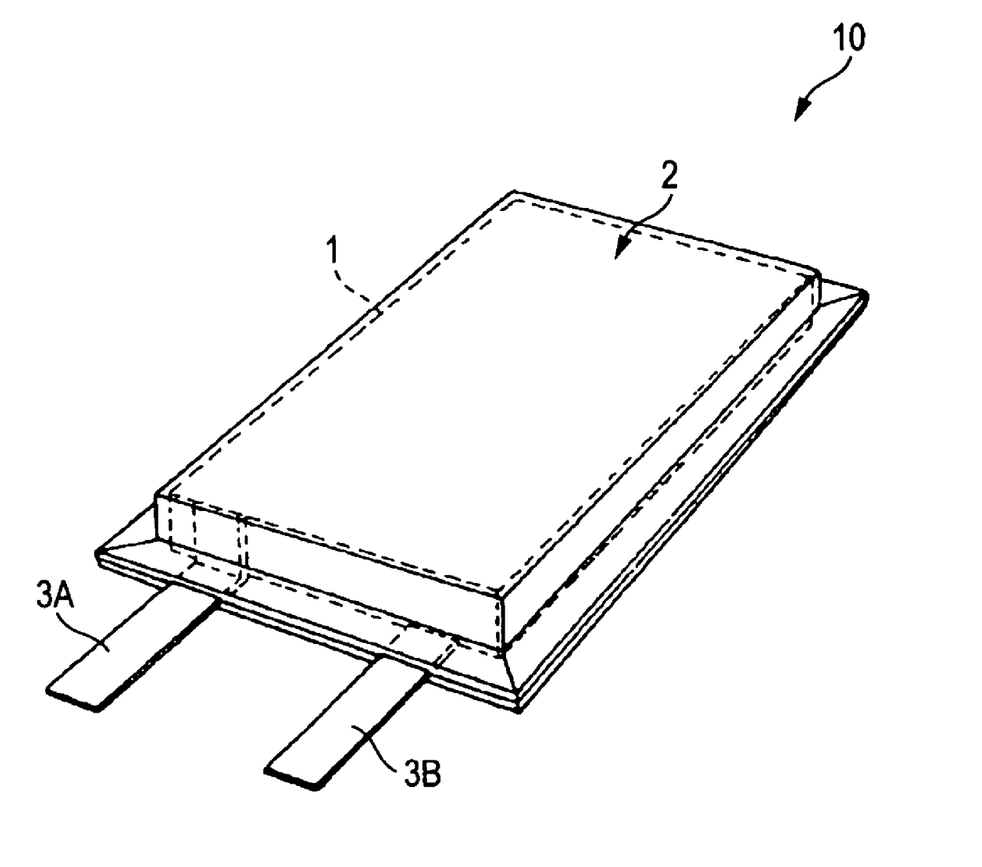
FIG. 1 is a diagrammatic slant view of invention batteries 1 to 3 and comparative batteries 1 to 3.

The positive electrode and the negative electrode were dried under reduced pressure at 150° C. for 12 hours. A microporous polypropylene film to which improved electrolyte retentivity had been imparted by surface modification with a polyacrylate was used as a separator. The electrodes and the separator were stacked in the order of negative electrode/separator/positive electrode and then wound into a flat shape to obtain a power generating element 1. As a sheath 2 was used a metal-resin composite film consisting of poly (ethylene terephthalate) (15 µm)/aluminum foil (50 µm)/metal-bondable polypropylene film (50 µm). The power generating element 1 was housed in the sheath 2 so that the open end parts of the positive terminal 3A and negative terminal 3B were exposed outside. The metal-resin composite film was airtightly sealed in the fusion-bonding area, except that part serving as an electrolyte injection hole, in which two sheets of the metal-resin composite film met each other with the respective inner sides facing inward. The non-aqueous electrolyte was injected through, the injection hole. Thereafter, the injection hole part was thermally sealed under vacuum. Thus, a flat type lithium secondary battery 10 shown in FIG. 1 was obtained which had a design capacity of 800 mAh.

According to the fabrication method shown above, a battery for an upper-limit voltage of 4.2 V, a battery for an upper-limit voltage of 4.4 V, and a battery for an upper-limit voltage of 4.6 V were fabricated in each of which the positive electrode employed the positive active material used in Example 8. These batteries are respectively referred to as invention battery 1, invention battery 2, and invention battery 3. On the other hand, a battery for an upper-limit voltage of 4.2 V, a battery for an upper-limit voltage of 4.4 V, and a battery for an upper-limit voltage of 4.6 V were fabricated in each of which the positive electrode employed the positive active material used in Comparative Example 2. These batteries are respectively referred to as comparative battery 1, comparative battery 2, and comparative battery 3.

(Initial Charge/Discharge Test)

All lithium secondary batteries fabricated were subjected to 10 cycles of initial charge/discharge at a temperature of 20° C. With respect to charging conditions, the upper-limit voltage for each battery was employed as the charge voltage and constant-current constant-voltage charge was conducted at a current of 0.1 ItA for 15 hours. With respect to discharging conditions, constant-current discharge was conducted at a current of 0.1 ItA to a final voltage of 3.0 V. The discharge capacity as measured in the 10th cycle is taken as "initial discharge capacity (mAh)".

(Charge/Discharge Cycle Test)

Subsequently, a charge/discharge cycle test was conducted. With respect to charging conditions, the upper-limit voltage for each battery was employed as the charge voltage and constant-current constant-voltage charge was conducted at a current of 1 ItA for 1.5 hours. With respect to discharging conditions, constant-current discharge was conducted at a current of 1 ItA to a final voltage of 3.0 V. After this charge/discharge cycle was repeated 100 times, the battery in a charged state was subjected to constant-current discharge at a current of 0.2 ItA and a final voltage of 3.0 V. The resultant discharge capacity was recorded. The percentage of this discharge capacity of each battery to the initial discharge capacity of the battery is taken as "capacity retention (%)".

(Constant-Voltage Application Test)

Invention battery 3 and comparative battery 3 were separately prepared and subjected to the initial charge/discharge test. Thereafter, a voltage of 4.6 V was continuously applied thereto for 2 weeks (336 hours). Constant-current discharge was then conducted at a current of 0.2 ItA to a final voltage of 3.0 V. The percentage of the discharge capacity of each battery in this discharge to the initial discharge capacity of the battery is taken as "capacity retention after continuous charge (%)".

The results of these tests are shown in Table 7 and Table 8.

TABLE 7

| Battery name | Upper-limit voltage (V) | Capacity retention (%) | | |
|---|---|---|---|---|
| | | 100th cycle | 200th cycle | 300th cycle |
| Invention battery 1 | 4.2 | 97.5 | 95.5 | 93.6 |
| Invention battery 2 | 4.4 | 97.4 | 94.9 | 91.8 |
| Invention battery 3 | 4.6 | 93.5 | 90.9 | 87.8 |
| Comparative battery 1 | 4.2 | 90.2 | 86.7 | 80.5 |
| Comparative battery 2 | 4.4 | 86.8 | 80.2 | 72.5 |
| Comparative battery 3 | 4.6 | 73.8 | 56 | 45.4 |

TABLE 8

| | Capacity retention after continuous charge (%) |
|---|---|
| Invention battery 3 | 98.4 |
| Comparative battery 3 | 95.0 |

The effect of the invention is apparent from the results given above. For example, a comparison between invention battery 3 and comparative battery 3, which are batteries for an upper-limit voltage of 4.6 V, shows the following. In comparative battery 3, in which base particles were employed as a positive active material without undergoing any treatment, the discharge capacity as measured after 300 cycles had decreased to below a half of the rated capacity. In contrast, in invention battery 3, which employed a positive active material comprising base particles and a Group 3 element present thereon, a discharge capacity close to 90% of the rated capacity was retained. By thus using a positive active material comprising base particles able to dope and release lithium ions and an element in Group 3 of the periodic table present on at least part of that part of the base particles which is able to come into contact with an electrolyte, a diminished capacity decrease and a high energy density can be secured even when a charge/discharge cycle is repeated at a high charge voltage, i.e., a voltage between the terminals of 4.6 V. This is thought to be because the positive electrode has come to withstand high potentials due to the use of the positive active material comprising base particles and a Group 3 element present thereon. This is supported by those results of the constant-voltage application test.

Although the Group 3 element imparted to the positive active material used in the battery tests was ytterbium, batteries employing a positive active material to which gadolinium has been imparted in place of ytterbium are also being tested at present. These batteries have so far shown battery performances higher than those of invention batteries 1 to 3; such high performances reflect the results of the constant-voltage application test described above.

The invention may be embodied in other various forms without departing from the spirit or essential characteristics thereof. The embodiments or Examples described above are therefore to be considered in all respects as illustrative and not restrictive. The scope of the invention is indicated by the claims rather than by the description, and all changes and modifications which come within the meaning and range of equivalency of the claims are intended to be embraced therein.

INDUSTRIAL APPLICABILITY

The invention can provide: a positive active material which can inhibit side reactions between the positive electrode and an electrolyte even at a high potential and which, when applied to a battery, can improve charge/discharge cycle performance without impairing battery performances even in storage in a charged state; and a process for producing the active material. A positive electrode employing the active material can be provided. Furthermore, a lithium secondary battery can be provided which has improved charge/discharge cycle performance while retaining intact battery performances even after storage in a charged state. A lithium secondary battery which has been designed to have a higher upper-limit working voltage than ordinary ones and has excellent charge/discharge cycle performance can also be provided.

The invention claimed is:

1. A positive active material, comprising:
    base particles able to dope and release lithium ions; and
    an oxide of at least one element selected from the group consisting of Gd, Ce and Yb on at least part of a part of the base particles which is able to come into contact with an electrolyte,
    wherein said at least one element is formed on a surface of said base particles, and is not incorporated in said base particles, and
    wherein a weight percent of said at least one element in terms of oxide is in a range from 0.01% to 4% of a total weight of said base particles and said at least one element in terms of oxide.

2. A positive electrode for lithium secondary batteries, comprising:
    the positive active material of claim 1.

3. A lithium secondary battery, comprising:
    the positive electrode for lithium secondary batteries of claim 2;
    a negative electrode employing a negative-electrode material able to dope and undope lithium ions; and
    a non-aqueous electrolyte.

4. The lithium secondary battery of claim 3, which is for use at an upper-limit voltage of 4.3 V or greater.

5. The positive active material of claim 1, wherein the weight percent of said at least one element in terms of oxide is in a range from 0.05% to 4% of the total weight of said base particles and said at least one element in terms of oxide.

6. A positive active material, comprising:
    base particles able to dope and release lithium ions; and
    an oxide of at least one element selected from the group consisting of Gd, Ce, and Yb formed on a surface of said base particles and not incorporated in said base particles,
    wherein a weight percent of said at least one element in terms of oxide is in a range from 0.01% to 4% of a total weight of said base particles and said at least one element in terms of oxide.

7. The positive active material of claim 6, wherein the base particles comprise $LiCoO_2$.

8. The positive active material of claim 6, wherein the base particles comprise a lithium-transition metal composite oxide having an $\alpha$-$NaFeO_2$ type crystal structure and represented by a composite formula $Li_xMn_aNi_bCo_cO_d$ (wherein $0 \leq x \leq 1.3$, $a+b+c=1$, $|a-b| \leq 0.03$, $0 \leq c < 1$, and $1.7 \leq d \leq 2.3$).

9. The positive active material of claim 6, wherein the base particles comprise $LiCoO_2$.

10. The positive active material of claim 6, wherein the base particles comprise a lithium-transition metal composite oxide having an $\alpha$-$NaFeO_2$ type crystal structure and represented by a composite formula $Li_xMn_aNi_bCo_cO_d$ (wherein $0 \leq x \leq 1.3$, $a+b+c=1$, $|a-b| \leq 0.03$, $0 \leq c < 1$, and $1.7 \leq d \leq 2.3$).

11. A positive electrode for lithium secondary batteries, comprising:
    the positive active material of claim 6.

12. A lithium secondary battery, comprising:
    the positive electrode for lithium secondary batteries of claim 11;
    a negative electrode employing a negative-electrode material able to dope and undope lithium ions; and
    a non-aqueous electrolyte.

13. The lithium secondary battery of claim 12, which is for use at an upper-limit voltage of 4.3 V or greater.

14. The positive active material of claim 6, wherein the weight percent of said at least one element in terms of oxide is in a range from 0.05% to 4% of the total weight of said base particles and said at least one element in terms of oxide.

* * * * *